Patented Mar. 29, 1949

2,465,870

UNITED STATES PATENT OFFICE 2,465,870

METHOD OF ENHANCING THE YIELD OF YEAST IN A WHEY MEDIUM

Austin M. Hanson, Nelson E. Rodgers, and Reginald E. Meade, Appleton, Wis., assignors to Western Condensing Company, San Francisco, Calif., a corporation of California No Drawing. Application March 17, 1947, Serial No. 735,246

1 Claim. (Cl. 195—82)

This invention relates to the production of yeast in whey.

In conventional methods for producing yeast, fermentation is ordinarily carried out at a pH of about 4.0 to 4.5. In many instances, the nutrient medium is not sterilized prior to fermentation, but the maintenance in the nutrient medium of relatively low pH values and the use of large inocula are depended upon to minimize or exclude the growth of other microorganisms.

We have now found that in the production of yeast by the fermentation of whey, greatly improved yields of yeast may be obtained by first sterilizing the whey at a pH of about 1.0 to 4.0 and preferably about 1.5 to 3.5, thereafter adjusting the pH of the sterilized whey to from 5.0 to 8.0 inoculating the whey with yeast and fermenting the inoculated whey.

We have further found that at a pH of from about 1.0 to 3.5, contaminating microorganisms are more easily killed by heating so that effective sterilization can be carried out at lower temperatures and/or within shorter time limits than those required at higher pH values.

It is therefore an important object of the present invention to provide a method for producing yeast from whey with improved yields including the step of sterilizing said whey at a pH of from 1.0 to 4.0 and preferably from 1.5 to 3.5 and initiating fermentation of the sterilized whey at a pH of from 5.0 to 8.0.

Another important object of this invention is to provide a method for producing yeast from sterile whey involving a sterilization step carried out at lower temperatures and/or shorter time limits than those ordinarily required for the sterilization of said whey.

Other and further objects and features of the present invention will become apparent from the following detailed description and appended claim.

The various features of the methods of the present invention are illustrated hereinbelow by a detailed description of numerous experiments carried out according to the principles of the present invention.

EXPERIMENT 1

Four yeast cultures were employed in this experiment identified, respectively, as cultures of *Saccharomyces fragilis* (No. 18), of *Torula kefir* (No. 21a–48–3), of *Mycotorula lactis* (No. 23) and of *Saccharomyces anamensis* (No. 42). Inocula were started from yeast-glucose-agar slants of these cultures in 25 ml. of a medium composed of deproteinized whey diluted to one-quarter strength with tap water, supplemented with 0.15 per cent $KH_2PO_4$, adjusted to a pH of 6.0, autoclaved at 121° C. for 30 minutes and subsequently supplemented aseptically with 0.1 per cent urea. The inocula were grown in the above medium contained in 500 ml. Erlenmeyer flasks agitated in a shaker at 30° C. for 48 hours and thereafter used to inoculate whey to be fermented in amounts equal to 5 per cent of the fermentation medium being inoculated.

In the preparation of the fermentation media, we employed whole whey diluted to one-quarter strength with tap water and supplemented with 0.15 per cent $KH_2PO_4$.

Aliquots of this whey were adjusted to acidities of pH 3.0, 4.0, 5.0, and 6.0, respectively, with sulfuric acid, dispensed in 25 ml. volumes per 500 ml. Erlenmeyer flask and autoclaved at 121° C. for 30 minutes. After the addition of 0.1 per cent urea aseptically, media in flasks representing each of the above mentioned pH treatments were readjusted aseptically to pH levels of 4.0, 5.0, 6.0 and 7.0, respectively, with sodium hydroxide or sulfuric acid. Thus a series of media were prepared which had been subjected to different acidities during sterilization, a series of media representing each pH of sterilization being readjusted subsequently to different initial pH levels for fermentation. In this way the influence of sterilization pH and initial fermentation pH on yeast growth could be evaluated separately.

Four sets of the above treated media were prepared and fermented in duplicate with cultures 18, 21a–48–3, 23 and 42, respectively. The fermentations were aerated by agitation in a shaker at 30° C. for 24 hours.

On completion of fermentation the dry weights of the centrifugally separated yeasts were determined, suitable corrections being applied for particulate solids present in identically treated but unfermented control media.

The dry weight yields of yeast obtained in this experiment are tabulated as follows:

| Culture Number | Acidity before sterilization | Acidity before inoculation | | | |
|---|---|---|---|---|---|
| | | pH 4.0, Dry weight | pH 5.0, Dry weight | pH 6.0, Dry weight | pH 7.0, Dry weight |
| | pH | mg. | mg. | mg. | mg. |
| 18 | 3.0 | 100 | 105 | 111 | 121 |
| | | 90 | 115 | 111 | 131 |
| | 4.0 | 53 | 58 | 61 | 68 |
| | | 54 | 58 | 61 | 68 |
| | 5.0 | 76 | 73 | 79 | 86 |
| | | 76 | 73 | 79 | 95 |
| | 6.0 | 75 | 95 | 87 | 85 |
| | | 70 | 87 | 85 | 105 |
| 21a–48–3 | 3.0 | 184 | 191 | 185 | 205 |
| | | 184 | 191 | 193 | 197 |
| | 4.0 | 172 | 182 | 182 | 195 |
| | | 172 | 182 | 176 | 195 |
| | 5.0 | 165 | 183 | 166 | 179 |
| | | 172 | 180 | 177 | 171 |
| | 6.0 | 167 | 173 | 180 | 186 |
| | | 175 | 175 | 180 | 186 |
| 23 | 3.0 | 70 | 78 | 91 | 96 |
| | | 70 | 78 | 91 | 96 |
| | 4.0 | 58 | 82 | 90 | 82 |
| | | 64 | 78 | 90 | 82 |
| | 5.0 | 49 | 71 | 73 | 79 |
| | | 49 | 61 | 73 | 79 |
| | 6.0 | 29 | 65 | 71 | 76 |
| | | 65 | 65 | 76 | 76 |
| 42 | 3.0 | 88 | 94 | 106 | 111 |
| | | 88 | 94 | 106 | 111 |
| | 4.0 | 81 | 88 | 97 | 103 |
| | | 81 | 85 | 97 | 103 |
| | 5.0 | 78 | 78 | 79 | 91 |
| | | 78 | 78 | 85 | 91 |
| | 6.0 | 69 | 83 | 89 | 95 |
| | | 72 | 76 | 89 | 95 |

The above tabulated data show that good yields of yeast were obtained when the medium was sterilized at pH 3.0, regardless of the initial fermentation pH. Sterilization pH values of 3.0 or 4.0 appeared to be equally favorable for culture 23 when the initial fermentation pH was adjusted to pH 5.0 or 6.0 In all cases sterilization at pH 3.0 promoted better yields than at pH 5.0 or above.

It will further be noted that, regardless of the pH at sterilization, best yields of yeast generally were obtained at initial fermentation acidities of pH 5.0 or above. Culture 18 appeared to be somewhat less inhibited by an initial fermentation pH of less than 5.0 than were the other three cultures.

EXPERIMENT 2

This experiment was conducted in the same manner as experiment No. 1, except that in the sterilization treatments the media were adjusted to acidities of pH 2.0, 3.0, 4.0, and 5.0 Further, the series of media subjected to sterilization at these pH values were subsequently adjusted to pH 5.0, 6.0, 7.0 and 8.0.

The yields of yeast thus obtained are tabulated as follows:

| Culture Number | Acidity before sterilization | Acidity before inoculation | | | |
|---|---|---|---|---|---|
| | | pH 5.0, Dry weight | pH 6.0, Dry weight | pH 7.0, Dry weight | pH 8.0, Dry weight |
| | pH | mg. | mg. | mg. | mg. |
| 18 | 2.0 | 110 | 110 | 126 | 110 |
| | | 104 | 114 | 126 | 116 |
| | 3.0 | 91 | 98 | 111 | 110 |
| | | 92 | 98 | 111 | 109 |
| | 4.0 | 88 | 97 | 96 | 98 |
| | | 82 | 97 | 96 | 98 |
| | 5.0 | 90 | 81 | 90 | 91 |
| | | 82 | 89 | 90 | 95 |
| 21a–48–3 | 2.0 | 194 | 191 | 190 | 186 |
| | | 198 | 189 | 175 | 187 |
| | 3.0 | | 183 | 196 | 189 |
| | | 181 | 186 | 173 | 190 |
| | 4.0 | 182 | 182 | 188 | 187 |
| | | 179 | 182 | 178 | 191 |
| | 5.0 | 182 | 187 | 189 | 185 |
| | | 182 | 184 | 190 | 185 |
| 23 | 2.0 | 115 | 128 | 141 | 118 |
| | | 115 | 128 | 138 | 118 |
| | 3.0 | 110 | 119 | 129 | 119 |
| | | 110 | 119 | 125 | 119 |
| | 4.0 | 107 | 116 | 111 | 89 |
| | | 108 | 116 | 109 | 91 |
| | 5.0 | 104 | 108 | 104 | 114 |
| | | 104 | 108 | 104 | 97 |
| 42 | 2.0 | 108 | 115 | 130 | 121 |
| | | 105 | 120 | 128 | 119 |
| | 3.0 | 103 | 112 | 120 | 114 |
| | | 97 | 109 | 120 | 114 |
| | 4.0 | 92 | 110 | 104 | 98 |
| | | 92 | 110 | 104 | 102 |
| | 5.0 | 92 | 104 | 108 | 100 |
| | | 92 | 104 | 110 | 106 |

As shown by the above tabulated yield figures, better yields of yeast generally were obtained when sterilization was carried out at acidities below pH 4.0 than when sterilization was carried out at an acidity of pH 4.0 or higher.

EXPERIMENT 3

In this experiment the relations between the different heat sterilization methods, acidity during heating, and yeast growth were investigated. The basal medium, procedure, and cultures were the same as in the preceding experiments, except that, in addition to varying the acidity of sterilization, the time, temperature and method of effecting sterilization were varied and the initial acidity of fermentation was held constant at pH 7.0. The acidity of sterilization was varied in the range pH 2.0, 2.5, 3.0, 3.5 and 4.0 Suitable aliquots of these adjusted wheys were sterilized by flowing steam (99° C.) for 10, 20, and 40 minutes, and by autoclaving at 121° C. for 5, 10, and 20 minutes respectively. All of these media subjected to different conditions of pH, temperature, and time of sterilization were then supplemented aseptically with 0.1 per cent urea, adjusted to pH 7.0 and tested for their ability to support yeast growth by the same techniques described in Experiment 1.

The yeast yields obtained in these fermentations are tabulated as follows:

*Culture 18*

| Acidity before sterilization | Time medium steamed | | |
|---|---|---|---|
| | 10 min., Dry weight | 20 min., Dry weight | 40 min., Dry weight |
| pH | Mg. | Mg. | Mg. |
| 2.0 | 113 | 116 | 120 |
| | 109 | 115 | 121 |
| 2.5 | 109 | 116 | 120 |
| | 114 | 115 | 124 |
| 3.0 | 110 | 112 | 121 |
| | 117 | 111 | 122 |
| 3.5 | 119 | 122 | 121 |
| | 119 | 121 | 122 |
| 4.0 | 100 | 103 | 100 |
| | 101 | 102 | 102 |

Culture 18

| Acidity before sterilization | Time medium autoclaved | | |
|---|---|---|---|
| | 5 min., Dry weight | 10 min., Dry weight | 20 min., Dry weight |
| pH | mg. | mg. | mg. |
| 2.0 | 121 | 125 | 120 |
| | 120 | 125 | 117 |
| 2.5 | 120 | 119 | 116 |
| | 117 | 119 | 120 |
| 3.0 | 119 | 116 | 115 |
| | 119 | 118 | 108 |
| 3.5 | 120 | 121 | 116 |
| | 120 | 116 | 116 |
| 4.0 | 95 | 100 | 98 |
| | 95 | 97 | 98 |

Culture 23

| Acidity before sterilization | Time media steamed | | |
|---|---|---|---|
| | 10 min., Dry weight | 20 min., Dry weight | 40 min., Dry wieght |
| pH | mg. | mg. | mg. |
| 2.0 | 95 | 109 | 114 |
| | 96 | 107 | 109 |
| 2.5 | 99 | 97 | 98 |
| | 96 | 96 | 111 |
| 3.0 | 88 | 94 | 100 |
| | 90 | 94 | 79 |
| 3.5 | 83 | 86 | 86 |
| | 83 | 88 | 84 |
| 4.0 | 94 | 84 | 88 |
| | 84 | 89 | 80 |

Culture 23

| Acidity before sterilization | Time media autoclaved | | |
|---|---|---|---|
| | 5 min., Dry weight | 10 min., Dry weight | 20 min., Dry weight |
| pH | Mg. | Mg. | Mg. |
| 2.0 | --- | 107 | 107 |
| | 103 | 109 | 111 |
| 2.5 | 103 | 102 | 109 |
| | 100 | 107 | 100 |
| 3.0 | 93 | 105 | 101 |
| | 90 | 104 | --- |
| 3.5 | 82 | 96 | 87 |
| | 81 | 91 | 87 |
| 4.0 | 68 | 87 | 83 |
| | 69 | 87 | 87 |

Culture 21a–48–3

| Acidity at which medium was sterilized | Time medium steamed | | |
|---|---|---|---|
| | 10 min., Dry weight | 20 min., Dry weight | 40 min., Dry weight |
| pH | Mg. | Mg. | Mg. |
| 2.0 | 191 | 182 | 186 |
| | 203 | 180 | 188 |
| 2.5 | 183 | 160 | 178 |
| | 205 | 173 | 177 |
| 3.0 | 192 | 177 | 176 |
| | 194 | 180 | 176 |
| 3.5 | 174 | 187 | 183 |
| | 180 | 186 | 194 |
| 4.0 | --- | 166 | 161 |
| | --- | 169 | 152 |

Culture 21a–48–3

| Acidity to which medium was sterilized | Time medium autoclaved | | |
|---|---|---|---|
| | 5 min., Dry weight | 10 min., Dry weight | 20 min., Dry weight |
| pH | mg. | mg. | mg. |
| 2.0 | 188 | 194 | 193 |
| | 187 | 195 | 195 |
| 2.5 | 172 | 183 | 193 |
| | 172 | 195 | 193 |
| 3.0 | 177 | 178 | 184 |
| | 172 | 175 | 179 |
| 3.5 | 181 | 177 | 180 |
| | 177 | 177 | 174 |
| 4.0 | 165 | 163 | ------ |
| | 164 | 161 | ------ |

Culture 42

| Acidity at which medium was sterilized | Time media steamed | | |
|---|---|---|---|
| | 10 min., Dry weight | 20 min., Dry weight | 40 min., Dry weight |
| pH | mg. | mg. | mg. |
| 2.0 | 95 | 98 | 112 |
| | 97 | 114 | 118 |
| 2.5 | 98 | 95 | 103 |
| | 102 | 106 | 91 |
| 3.0 | 85 | 101 | 99 |
| | 97 | 94 | 90 |
| 3.5 | 75 | 88 | 97 |
| | 89 | 89 | 102 |
| 4.0 | 68 | 82 | 74 |
| | 76 | 88 | 80 |

Culture 42

| Acidity at which medium was sterilized | Time medium autoclaved | | |
|---|---|---|---|
| | 5 min., Dry weight | 10 min., Dry weight | 20 min., Dry weight |
| pH | mg. | mg. | mg. |
| 2.0 | 106 | 111 | 109 |
| | 102 | 102 | 108 |
| 2.5 | 102 | 97 | 99 |
| | 97 | 101 | 26 |
| 3.0 | 98 | 90 | 92 |
| | 94 | 97 | 96 |
| 3.5 | 105 | 85 | 79 |
| | 90 | 81 | 83 |
| 4.0 | 85 | 78 | 75 |
| | 85 | 66 | 75 |

The above tabulated data show that, regardless of the time or temperature of sterilization, better yields of yeast are obtained when sterilization was carried out at a pH of 3.5 or less than when sterilization was carried on at a pH of 4.0.

EXPERIMENT 4

In this experiment, inocula were prepared in the manner described in Experiment 1 from cultures 18, 23 and 42.

In this experiment the relative efficacy of sterilization at pH 1.5 and 2.0 and the effect of sterilization time in promoting yeast growth were examined. Two different batches of whey, referred to hereinafter as whey A and whey B, were tested simultaneously in this experiment. The procedure and conditions were identical with those in Experiment 1, except that the pH of sterilization was varied only at pH 1.5 and 2.0; aliquots of each of the variously adjusted media were autoclaved at 121° C. for 4, 6, 8, 10, 12, 14, 16, 18 and 20 minutes, respectively, and the initial fermentation reaction of all of the media was adjusted to pH 7.0. Yeast yield determinations were made on cultures 18, 23 and 42.

The yields thus obtained from whey A and whey B are tabulated as follows:

Culture 18

| Sterilization time | Sterilization acidity | Whey A, Dry weight | Whey B, Dry weight |
|---|---|---|---|
| Minutes | pH | Mg. | Mg. |
| 4 | 1.5 | 139 | 82 |
|  |  | 142 | ----- |
|  | 2.0 | 130 | 73 |
|  |  | 131 | 78 |
| 6 | 1.5 | 135 | 83 |
|  |  | 138 | 80 |
|  | 2.0 | 140 | 88 |
|  |  | 135 | ----- |
| 8 | 1.5 | 138 | 89 |
|  |  | 135 | 83 |
|  | 2.0 | 132 | 86 |
|  |  | 133 | 82 |
| 10 | 1.5 | 139 | 85 |
|  |  | 133 | 90 |
|  | 2.0 | 132 | 72 |
|  |  | 134 | ----- |
| 12 | 1.5 | 141 | 76 |
|  |  | ----- | 73 |
|  | 2.0 | 134 | 84 |
|  |  | 145 | 82 |
| 14 | 1.5 | 141 | 82 |
|  |  | 144 | 81 |
|  | 2.0 | 140 | 80 |
|  |  | ----- | 82 |
| 16 | 1.5 | 137 | 89 |
|  |  | 143 | 82 |
|  | 2.0 | 124 | 87 |
|  |  | 142 | 83 |
| 18 | 1.5 | 144 | 87 |
|  |  | 140 | 85 |
|  | 2.0 | 139 | 88 |
|  |  | 138 | 89 |
| 20 | 1.5 | 147 | 83 |
|  |  | 138 | 24 |
|  | 2.0 | 140 | 88 |
|  |  | 147 | --- |

Culture 23

| Sterilization time | Sterilization acidity | Whey A, Dry weight | Whey B, Dry weight |
|---|---|---|---|
| Minutes | pH | Mg. | Mg. |
| 4 | 1.5 | 138 | 102 |
|  |  | 140 | 92 |
|  | 2.0 | 138 | 97 |
|  |  | 137 | 93 |
| 6 | 1.5 | 139 | 91 |
|  |  | 141 | 87 |
|  | 2.0 | 145 | 99 |
|  |  | 130 | 98 |
| 8 | 1.5 | 140 | 99 |
|  |  | 135 | 90 |
|  | 2.0 | 138 | 99 |
|  |  | 140 | 98 |
| 10 | 1.5 | 146 | 87 |
|  |  | 143 | --- |
|  | 2.0 | 142 | 82 |
|  |  | 144 | 78 |
| 12 | 1.5 | 140 | 74 |
|  |  | 143 | 79 |
|  | 2.0 | 143 | 89 |
|  |  | 147 | 92 |
| 14 | 1.5 | 141 | 80 |
|  |  | 146 | 86 |
|  | 2.0 | 143 | 86 |
|  |  | 148 | 93 |
| 16 | 1.5 | 155 | 87 |
|  |  | 148 | 87 |
|  | 2.0 | 154 | 98 |
|  |  | 151 | 95 |
| 18 | 1.5 | 143 | 85 |
|  |  | 138 | 86 |
|  | 2.0 | 145 | 91 |
|  |  | 145 | 95 |
| 20 | 1.5 | 137 | 90 |
|  |  | 144 | 84 |
|  | 2.0 | 150 | 109 |
|  |  | 151 | 97 |

Culture 42

| Sterilization time | Sterilization acidity | Whey A, Dry weight | Whey B, Dry weight |
|---|---|---|---|
| Minutes | pH | Mg. | Mg. |
| 4 | 1.5 | 133 | 95 |
|  |  | 139 | 96 |
|  | 2.0 | 132 | 92 |
|  |  | 135 | ----- |
| 6 | 1.5 | 136 | 95 |
|  |  | 130 | 86 |
|  | 2.0 | 136 | 89 |
| 8 | 1.5 | 143 | 96 |
|  |  | 142 | 92 |
|  | 2.0 | 134 | 93 |
|  |  | 135 | 91 |
| 10 | 1.5 | 142 | 91 |
|  |  | 133 | 93 |
|  | 2.0 | 131 | 83 |
|  |  | 134 | 73 |
| 12 | 1.5 | 138 | 82 |
|  |  | 135 | 88 |
|  | 2.0 | 135 | 88 |
|  |  | 132 | 91 |
| 14 | 1.5 | 138 | 89 |
|  |  | 139 | 95 |
|  | 2.0 | 136 | 91 |
|  |  | 137 | ----- |
| 16 | 1.5 | 139 | 94 |
|  |  | 131 | 93 |
|  | 2.0 | 136 | 91 |
|  |  | 138 | 94 |
| 18 | 1.5 | 129 | 100 |
|  |  | 132 | 112 |
|  | 2.0 | 133 | 90 |
|  |  | 134 | 89 |
| 20 | 1.5 | 141 | 87 |
|  |  | 136 | 90 |
|  | 2.0 | 132 | 105 |
|  |  | 133 | 102 |

As shown by these data, in most cases, substantially equivalent yields were obtained by sterilization at pH 1.5 and 2.0, regardless of sterilization time.

EXPERIMENT 5

In the foregoing experiments, the beneficial effect of low pH sterilization on yeast growth has been illustrated only for four species of yeast. In the following experiment several additional species or strains have been tested to demonstrate more fully the general effectiveness of the pH control.

The basal medium and procedure were identical with those in Experiment 1 with the following exceptions. Suitable aliquots of the basal medium were adjusted to pH 1.5 and 6.0. The media adjusted to pH 1.5 and 6.0 were autoclaved at 121° C. for 10 and 30 minutes, respectively, after which both media were supplemented aseptically with 0.1 per cent urea. The aliquots of the pH 1.5 media were readjusted to an initial fermentation pH of 7.0, whereas the medium sterilized at pH 6.0 was not readjusted.

Duplicate sets of flasks of each of the two media were inoculated with the various types of lactose-fermenting yeasts tabulated hereinbelow and incubated as in Experiment 1. The yields of yeast obtained were tabulated as follows:

| Culture Number | Description of Culture | Medium sterilized at— | |
|---|---|---|---|
|  |  | pH 2.0, Dry weight | pH 6.0, Dry weight |
|  |  | Mg. | Mg. |
| 100-52 | Candida arborea | 42 | 25 |
|  |  | 30 | 11 |
| 100-53 | ...do... | 88 | 20 |
|  |  | 38 | 38 |
| 100-54 | Candida pulcherrima | 72 | 40 |
|  |  | 54 | 9 |
| 100-55 | Torulopsis utilis | 15 | 0 |
|  |  | 15 | 2 |
| 100-56 | Monilia candida | 61 | 23 |
|  |  | 22 | 0 |

| Culture Number | Description of Culture | Medium sterilized at— | |
|---|---|---|---|
| | | pH 2.0, Dry weight | pH 6.0, Dry weight |
| | | Mg. | Mg. |
| 100-57 | Mycelial type | 151 | 81 |
| | | 151 | 66 |
| 100-60 | Pressed yeast I Mycelial type | 54 | 3 |
| | | 38 | 25 |
| 100-61 | Pressed yeast I Oidium a | 140 | 105 |
| | | 139 | 106 |
| 100-62 | Pressed yeast I Oidium b | 136 | 119 |
| | | 117 | 135 |
| 100-63 | Pressed yeast II Torula type | 10 | 0 |
| | | 14 | 0 |
| 100-66 | Pressed yeast III Mycelial type | 65 | 19 |
| | | 36 | 15 |
| 100-67 | Oidium lactis A lenzing | 42 | 0 |
| | | 55 | 21 |
| 100-72 | Pressed yeast Lesser Holzminder | 38 | 0 |
| | | 55 | 8 |

As shown by the above tabulated yield data more yeast was obtained from the nutrient media sterilized at an acidity of pH 2.0 than from the medium sterilized at an acidity of pH 6.0.

The foregoing experiments have been described as illustrative examples of the application of the methods of this invention. These experiments show that consistently good yields of yeast are obtained in the fermentation of whey, when said whey is sterilized at an acidity of about pH 1.5 to 3.5 and when the pH of said whey at the initiation of the fermentation is adjusted to between 5.0 and 8.0. It should be understood that sterilization may be carried out at acidities as low as pH 1.0, with equally good results. Occasionally, good yields of yeast may be obtained when sterilizing at other acidities, for instance a pH of 4.0, and when fermentation is initiated at other pH values, but outside the indicated sterilization acidities and pH values at the initiation of fermentation, such improved yields cannot be secured consistently. The maintenance of the indicated pH values at the beginning of sterilization and at the initiation of fermentation, on the other hand, will insure consistently improved yields of yeast.

Many details of procedure may be varied within a wide range without departing from the principles of this invention and without sacrificing the advantages disclosed hereinabove and it is, therefore, not our purpose to limit the patent granted on this invention otherwise than necessitated by the scope of the appended claim.

We claim as our invention:

The method of preparing yeast by the fermentation of whey which comprises adjusting the pH of said whey to between 1.5 and 3.5, heat sterilizing said whey, adjusting the pH of the sterilized whey to between 5.0 and 8.0, inoculating the sterilized medium with a yeast culture, fermenting the whey, and recovering the yeast from the fermented whey.

AUSTIN M. HANSON.
NELSON E. RODGERS.
REGINALD E. MEADE.

REFERENCES CITED

The following references are of record in the file of this patent:

UNITED STATES PATENTS

| Number | Name | Date |
|---|---|---|
| 2,182,141 | Kauffmann et al. | Dec. 12, 1939 |